United States Patent
Morrison et al.

(10) Patent No.: US 9,160,863 B2
(45) Date of Patent: Oct. 13, 2015

(54) DIRECTORY NUMBER MOBILITY UTILIZING DYNAMIC NETWORK DISTRIBUTED DIAL-PEER UPDATES

(71) Applicant: Cisco Technology, Inc., San Jose, CA (US)

(72) Inventors: Scott A. Morrison, Niceville, FL (US); Stephen M. Orr, Wallkill, NY (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/010,879

(22) Filed: Aug. 27, 2013

(65) Prior Publication Data

US 2013/0343376 A1 Dec. 26, 2013

Related U.S. Application Data

(63) Continuation of application No. 12/983,549, filed on Jan. 3, 2011, now Pat. No. 8,532,085, which is a continuation of application No. 12/333,691, filed on Dec. 12, 2008, now Pat. No. 7,864,766.

(51) Int. Cl.
*H04L 12/66* (2006.01)
*H04M 7/00* (2006.01)
*H04M 3/42* (2006.01)

(52) U.S. Cl.
CPC ........ *H04M 7/0075* (2013.01); *H04M 3/42272* (2013.01)

(58) Field of Classification Search
None
See application file for complete search history.

(56) References Cited

U.S. PATENT DOCUMENTS

| | | | | |
|---|---|---|---|---|
| 6,449,284 | B1* | 9/2002 | Hagirahim | 370/466 |
| 7,139,811 | B2* | 11/2006 | Lev Ran et al. | 709/217 |
| 2003/0176188 | A1* | 9/2003 | O'Neill | 455/433 |
| 2004/0057425 | A1* | 3/2004 | Brouwer et al. | 370/352 |
| 2004/0202153 | A1* | 10/2004 | Koyama | 370/352 |
| 2005/0180403 | A1* | 8/2005 | Haddad et al. | 370/352 |
| 2006/0039539 | A1* | 2/2006 | Goldman et al. | 379/45 |
| 2007/0135128 | A1* | 6/2007 | Villa et al. | 455/445 |
| 2007/0263614 | A1* | 11/2007 | Sakai | 370/356 |
| 2008/0186963 | A1* | 8/2008 | Trasi et al. | 370/389 |
| 2009/0074176 | A1* | 3/2009 | Mori et al. | 379/310 |
| 2009/0238172 | A1* | 9/2009 | Tanizawa et al. | 370/352 |

* cited by examiner

*Primary Examiner* — Otis L Thompson, Jr.
(74) *Attorney, Agent, or Firm* — Patterson + Sheridan, LLP (57) ABSTRACT

Methods, logic, apparatus, and systems are provided to support cross cluster directory number (DN) extension mobility (EM) using dynamic network distributed dial-peer updates in a communication networks, which includes a plurality of clusters or systems and each of the plurality of clusters including a call control agent (CCA). Identification data corresponding to an identity of an associated user is received into a first cluster of a multiple cluster telecommunication network. A directory number and associated first telecommunication device corresponding to the user are registered with a first call control agent of the first cluster in accordance with received identification data. Registration data corresponding to the registered directory number is communicated to at least a second cluster of the telecommunications network. An incoming connection request associated with the registered directory number is routed directly to the first CCA without redirection to any other CCAs within the multiple cluster telecommunication network.

20 Claims, 8 Drawing Sheets

DIRECTORY NUMBER MOBILITY UTILIZING DYNAMIC NETWORK DISTRIBUTED DIAL-PEER UPDATES

CROSS REFERENCE TO RELATED APPLICATIONS

This application is a continuation of U.S. patent application Ser. No. 12/983,549, filed Jan. 3, 2011 which is a continuation of U.S. patent application Ser. No. 12/333,691, filed Dec. 12, 2008.

TECHNICAL FIELD

The present disclosure relates generally to the field of telecommunications, and more specifically, to a methods, systems, logic and apparatus for providing authenticated directory number (DN) mobility in Internet Protocol Telephony (IPT) utilizing dynamic network distributed dial-peer updates.

BACKGROUND

The integration of IPT on data networks (e.g., Internet), made many features available to users of Voice over IP (VoIP) that were not necessarily available to users of traditional telecommunication networks or systems, such as, for example, the Public Switched Telephone Networks (PSTN). One such feature now available by Cisco, as an example, is Cisco's Extension Mobility which, among other things, allows a user to log onto any extension mobility-enabled IP device (e.g., an IP Telephone) with a user's ID credentials and to transfer their user profile to that telephone. The transfer of the user's profile configures the extension mobility-enabled IP telephone as their own, on a temporary basis, with the user's preferences such as line numbers, speed dials, services, permissions, and other user-specific properties. This makes employee desk-sharing and roaming within an organization practical. Although the basic extension mobility feature does not allow users to traverse between different IPT clusters such as in different cities within the network or routed networks, an enhancement to extension mobility is provided allowing users to log onto any enhanced mobility-enabled IP device (e.g., IP Telephone) regardless of the unified communications manager cluster within the overall network. The user may log in with a combination of user credentials (e.g., user ID and PIN, biometric, magnetic and/or smart card) and the user's profile is transferred to that telephone and their directory number is inserted into the local call control agent. The authentication server then instructs the call control agent to provision the enhanced extension mobility-enabled IP telephone as his own on a temporary basis, with the user's preferences such as line numbers, speed dials, services, permissions, and other user-specific properties configured accordingly. This temporary visitor "registration" may be cross-cluster.

In other words, the enhanced extension mobility feature allows users to traverse different clusters (administrative domains) within a network. However, in current VoIP deployments that cover various regions, a dialing plan is generally setup with the local regional PSTN dialing codes. The dial search patterns are stored in a locally significant scope called a partition with each phone line number assigned to a partition. Within the current context, the directory number portability provided by the current feature functionally operates as a "call forward all" wherein all incoming calls are first routed to the user's "home" call control agent (location where their directory number is registered) and thereafter routed to the "guest" telephone where the user is authenticated to use. Although the user's directory number is "portable" in this scheme, it is effectively tied to the user's home call control agent and the user cannot move between administrative domains. This permanent registration of the directory number to a "home" call control agent may cause a single point of failure in a highly mobile environment, as well as sub-optimal routing of voice calls within the network. It does not provide seamless directory number mobility across multiple clusters within one or more enterprise data network domains. It does not associate a user's directory number to the potentially mobile user (analogous to their social security number) but instead registers the user's directory number with the user's home IP device or home unified communications manager cluster and provides re-direction of incoming connection requests from the user's home unified communications manager cluster to the cluster where the user is temporarily "registered" as a visitor. It is to be appreciated that this is not a true registration of the user's DN with the visited cluster, call control agent or temporary device.

BRIEF DESCRIPTION OF THE DRAWINGS

The accompanying drawings incorporated herein and forming a part of the specification, illustrate example embodiments, and together with the description serve to explain the principles of the embodiments.

OVERVIEW OF EXAMPLE EMBODIMENTS

The following presents a simplified summary of the example embodiments in order to provide a basic understanding of the example embodiments. This summary is not an extensive overview of the example embodiments. It is intended to neither identify key or critical elements of the embodiments nor delineate the scope of the embodiments. Its sole purpose is to present some concepts of the example embodiments in a simplified form as a prelude to the more detailed description that is presented later.

In accordance with an example embodiment, a method, system, and logic is provided for directory number (DN) mobility utilizing dynamic dial-peer updates in an associated communication network, which includes a plurality of clusters, each of the plurality of clusters including a call control agent. One example call control agent is Cisco's Unified Communications Manager. The method includes receiving, into a first cluster of a multiple cluster telecommunication network, identification data corresponding to an identity of an associated user having a directory number previously registered within the multiple cluster telecommunication network; registering the directory number and an associated first telecommunication device corresponding to the user with a first call control agent of the first cluster in accordance with received identification data; communicating registration data corresponding to the directory number being registered with the first call control agent of the first cluster to at least a second cluster of the telecommunications network; and, routing an incoming connection request associated with the registered directory number received by the multiple cluster telecommunication network directly to the first telecommunication device in accordance with the registration data.

In accordance with another example embodiment, logic encoded in one or more tangible media for execution and when executed is operable to receive, into a first cluster of a multiple cluster telecommunication network, identification data corresponding to an identity of an associated user having a directory number previously registered within the multiple cluster telecommunication network; register a directory number and associated first telecommunication device corresponding to the user with a first call control agent of the first cluster in accordance with received identification data; communicate registration data corresponding to the directory number being registered with the first call control agent of the first cluster to at least a second cluster of the telecommunications network; and, route an incoming connection request associated with the registered directory number received by the multiple cluster telecommunication network directly to the first telecommunication device in accordance with the registration data.

In accordance with a further example embodiment, a directory number mobility apparatus comprises an input operable to receive, into a first cluster of a multiple cluster telecommunication network, identification data corresponding to an identity of an associated user having a directory number previously registered within the multiple cluster telecommunication network; a registry including logic operable to register a directory number and associated first telecommunication device corresponding to the user with a first call control agent of the first cluster in accordance with received identification data; a broadcaster including logic operable to communicate registration data corresponding to the directory number being registered with the first call control agent of the first cluster to at least a second cluster of the telecommunications network; and, a router operable to route an incoming connection request associated with the registered directory number received by the multiple cluster telecommunication network directly to the first telecommunication device in accordance with the registration data.

In accordance with a still further example embodiment, a directory number mobility system comprises means for receiving, into a first cluster of a multiple cluster telecommunication network, identification data corresponding to an identity of an associated user having a directory number previously registered within the multiple cluster telecommunication network; means for registering a directory number and associated first telecommunication device corresponding to the user with a first call control agent of the first cluster in accordance with received identification data; means for communicating registration data corresponding to the directory number being registered with the first call control agent of the first cluster to at least a second cluster of the telecommunications network; and, means for routing an incoming connection request associated with the registered directory number to the first telecommunication device in accordance with the registration data.

There are shown and described herein example embodiments simply by way of illustration of at least one of the best modes best suited to carry out the embodiments. As it will be realized, there may be other different embodiments and several details are capable of modifications in various obvious ways. Accordingly, the drawings and descriptions herein will be regarded as illustrative in nature and not as restrictive.

Description of Example Embodiments

This description provides examples not intended to limit the scope of the claims. The figures generally indicate the features of the examples, where it is understood and appreciated that like reference numerals are used to refer to like elements.

Figure 1:
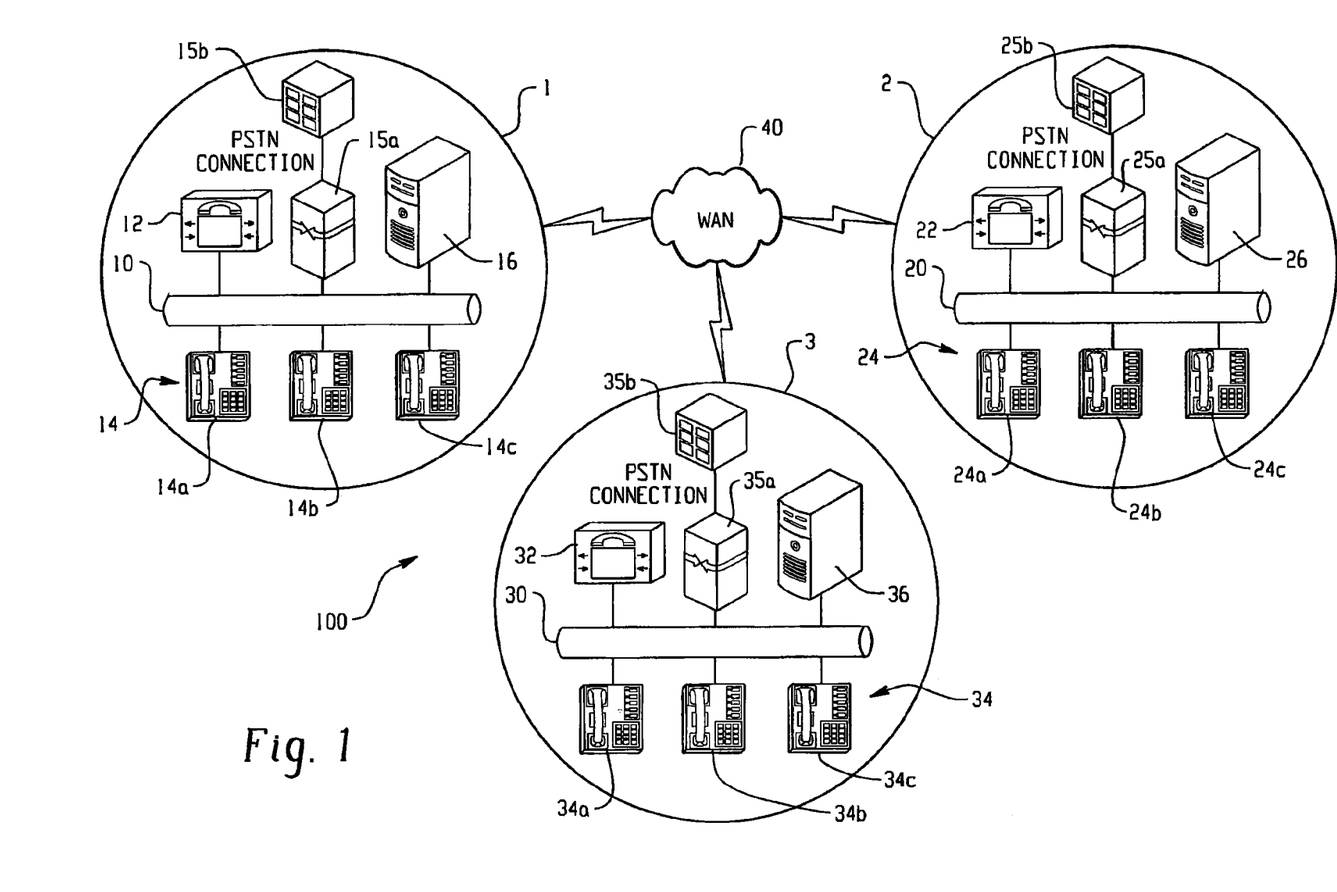
FIG. 1 is a schematic block diagram illustrating an example communication network for supporting directory number mobility.

FIG. 1 is a schematic block diagram illustrating an example communication network 100 for supporting directory number (DN) mobility. With reference now to that figure, communication network 100 includes a plurality of clusters 1, 2, and 3 interconnected via a wide area network (WAN) 40. Communication network 100 may include two or more clusters although only three clusters are shown. Each cluster 1, 2, and 3 is served by an Internet protocol telecommunication (IPT) call control agent (CCA) 12, 22, and 32, respectively, and further includes a plurality of IP telecommunication devices 14, 24, and 34. Further, in the illustrated example embodiment, each cluster 1, 2, and 3 includes an IP telecommunication gateway 15*a* 25*a*, 35*a* connecting a conventional public switched telephone network (PSTN) 15*b*, 25*b*, 35*b*, and an authentication and directory server system 16, 26, 36. Each of the above described components in a cluster is coupled to a computer data network operable to transmit all forms of signals including data, audio and/or video signals. Computer data networks 10, 20, and 30 may be any type of network that allows the transmission of audio and/or video signals, as well as traditional data communications. In communication network 100 illustrated in FIG. 1, networks 10, 20, and 30 are IP networks. Telecommunication signals may be transmitted between any of the devices or network components located in any of the clusters. For example, IP telecommunication devices 14*a*, 14*b*, and 14*c* are coupled to network 10 to allow such communication over other clusters in communication network 100 such as, for example, with IP telecommunication devices 24*a*, 24*b*, and 24*c* coupled to network 20 and/or IP telecommunication devices 34*a*, 34*b*, and 34*c* coupled to network 30 and with other devices on clusters not shown.

Although a specific communication network 100 is illustrated in FIG. 1, the term "communication network" should be interpreted as generically defining any network capable of transmitting telecommunication signals, data, and/or messages. In the illustrated embodiment, communication network 100 may include a plurality of local area networks (LANs) interconnected using the wide area network (WAN) 40, wherein each LAN and WAN is a computer data network that is further operable to transmit audio and/or video telecommunication signals. In a particular embodiment, LANs and WAN 40 are Internet Protocol (IP) networks. However, they may be any type of network that allows the transmission of audio and video telecommunication signals and data, as well as traditional data communications. Therefore, although subsequent description will primarily focus on IP communications, it should be understood that other appropriate method of transmitting telecommunications over a data network, such as a Frame Relay, ATM, or other packet-based network, are also included within the scope of the present invention. Accordingly, although an example embodiment includes IP telephony devices it is to be appreciated that the embodiment or other embodiments are not limited to telephony devices and any form of telecommunication device may be used and may form a part of the embodiments.

In an example embodiment the telecommunication devices are IP telephony devices 14, 24, and 34 and may include telephones, facsimile machines, computers running telephony software (e.g., SoftClient), or any other device capable of performing telephony functions over an IP-based network. Each IP telephony device is a node on the network and has its own IP address and Media Access Control (MAC) layer address (IP/MAC address).

Each call control agent 12, 22, and 32 manages IP telephony devices 14, 24, and 34 within each of the cluster. For example, call control agent 12 manages device 14*a*, 14*b*, and 14*c* and IP calls made over network 10 in cluster 1, which may include call processing, routing, telephone features and supplementary services (such as call hold, call transfer, and caller ID), device configuration, and other telephony functions and parameters. A suitable example of an IP telephony call control agent 12, 22, 32 is Cisco Unified Communications Manager version 4.0 and higher. However, other forms of call control agent may be used as desired.

Each cluster 1, 2, and 3 in the communication network 100 further includes an authentication and directory server 16, 26, 36 which is coupled to WAN 40 through the respective computer data networks 10, 20, 30. The authentication and directory servers 16, 26, 36 function in the example embodiment as policy management servers and include services such as authentication, authorization, and accounting within the cluster and network. In addition, the authentication and directory servers may be resident on a call control agent or may be configured to host various IP telephony applications, such as mobility, recording, paging, conferencing, speech-enabled applications, IP telephone services, and other voice and data-converged applications. For this purpose, however, a dedicated application server (not shown) may be located anywhere in communication network 100; for example, it may be located in one of the clusters or coupled with/within WAN 40.

Figure 2A:
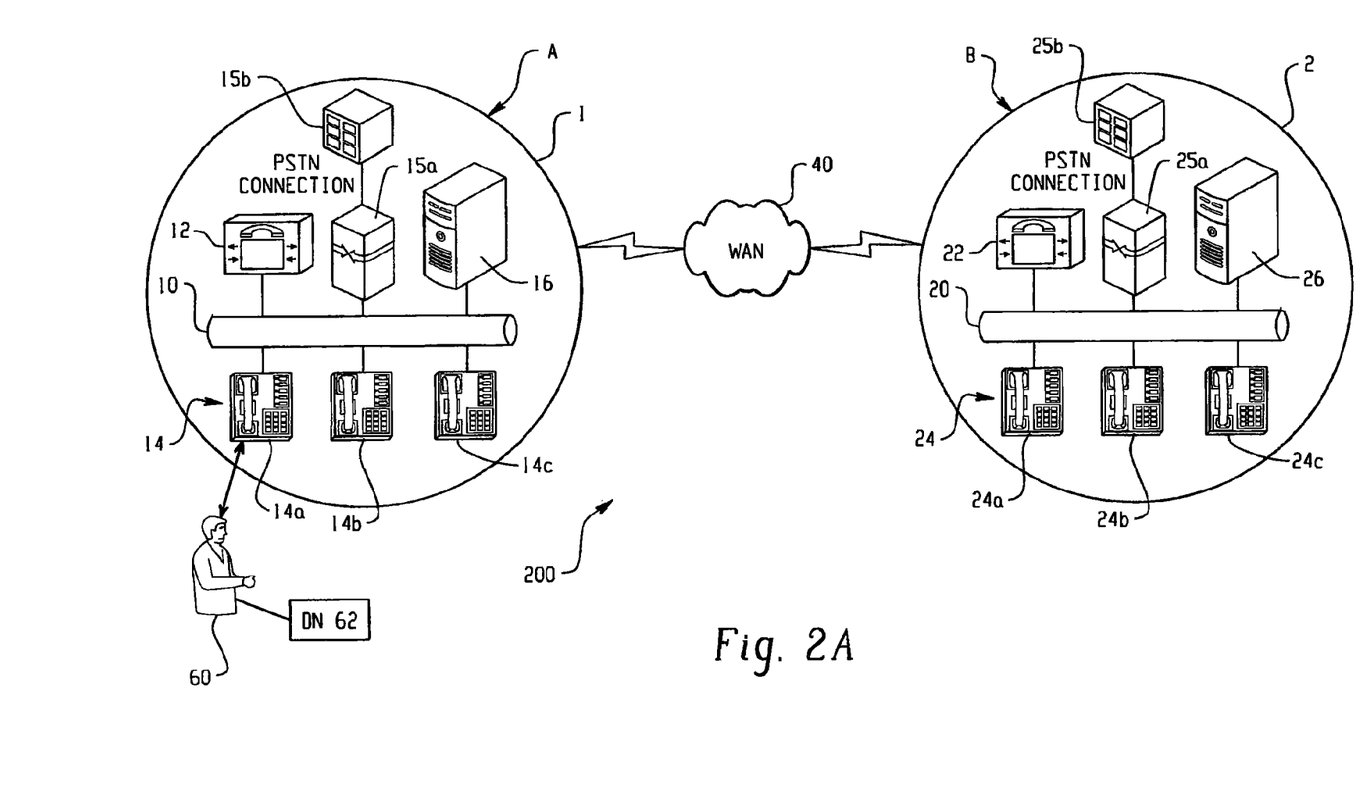
FIG. 2A is a schematic block diagram illustrating an example system for supporting directory number mobility in the communication network of FIG. 1.
Figure 2B:
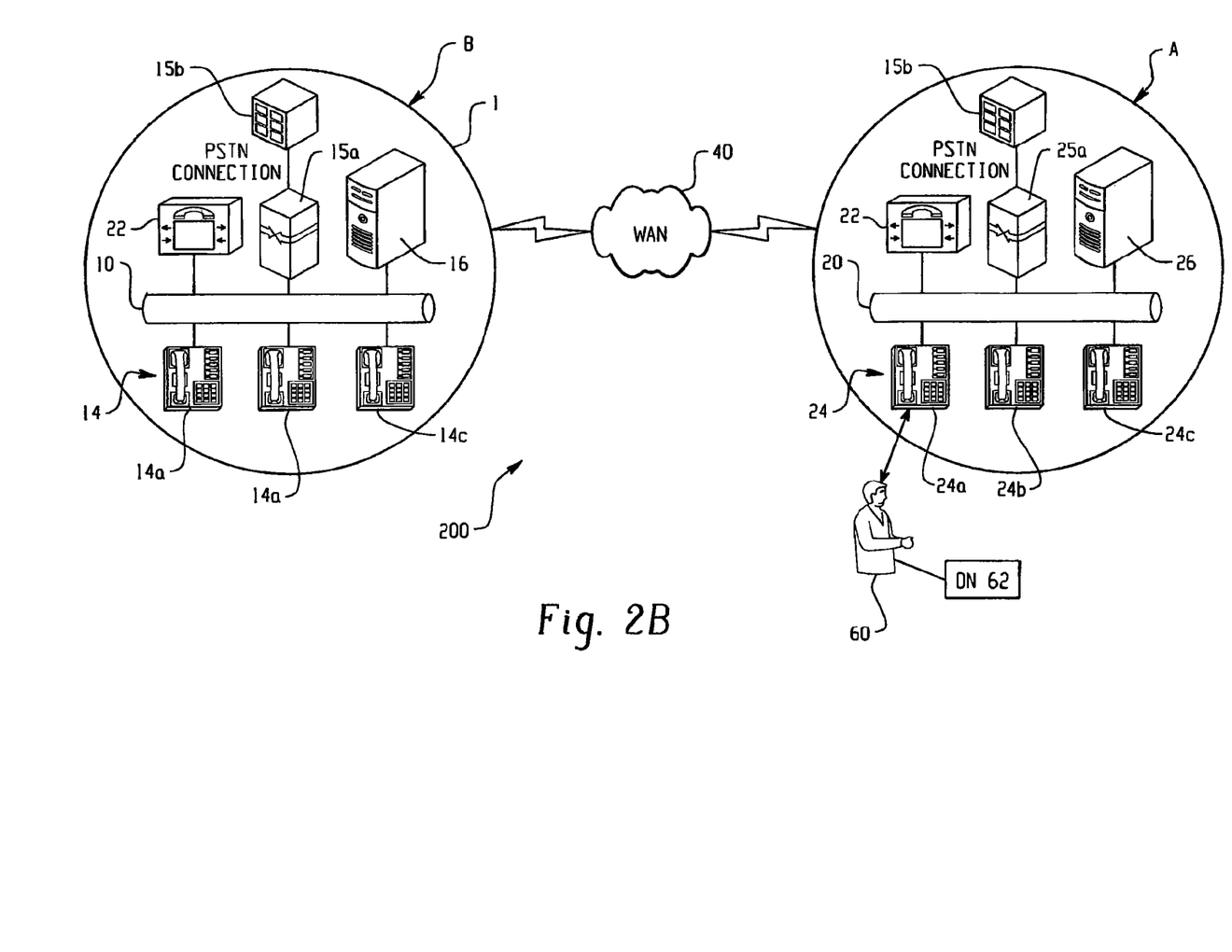
FIG. 2B is a schematic block diagram illustrating an example system for supporting directory number mobility in the communication network of FIG. 1.

FIGS. 2A & 2B are the schematic block diagrams illustrating a system 200 of an example embodiment for supporting directory number mobility in the communication network of FIG. 1 wherein a user 60 having a directory number (DN) may move between first and second clusters 1, 2.

System 200 is an instance of the communication network 100 of FIG. 1, which includes the first cluster 1 operative as a "home" cluster A and the second cluster 2 operative as a "remote" cluster B, connected via WAN 40. From the perspective of a user 60, home cluster A may be the user's permanent office location (or home office), while the remote cluster B is the cluster that the user 60 is temporarily visiting (remote office or other campus). A directory number (DN) 62 is associated with the user who may move freely within the system 200 such as between the first and second clusters 1, 2. As such, the designation of "home" and "remote" is relative to each other. Home cluster may be determined either from information returned during the authentication process or by comparing the users DN area code prefix to its database of locally responsible prefixes. In the example embodiments, the directory numbers are assigned to users within the directory structure rather than to devices (IP Telephony endpoints) within the system 200. Therefore, in the example embodiments, the home cluster is the cluster where the user's directory number area code prefix originates. The user may provide further details on how to compute his default home cluster based on the user ID or other information stored in the global authentication database. The user is associated with a user device profile, which is stored in either the directory database or within the authentication, authorization, and accounting database. The user device profile defines various telephony features configured for the particular user, such as his local directory numbers, subscribed service, speed dials, voice mail profile and others. For example, a user who is associated with the Europe cluster and visiting Asia will be able to go up to a telephone that has the cross cluster directory number mobility service enabled and to log on. As such, most/all features available to the user in his home cluster, Europe in this case, will be available in the remote cluster, Asia. Further, as such and in accordance with the embodiments herein, the user's directory number 62 becomes registered with the IP Call Control Agent in the remote cluster, Asia, effectively making the Asia cluster the user's new remote cluster. A default home cluster is useful when the user logs out from or deregisters his directory number from a remote cluster. Thereafter, calls are routed to the user's default home cluster when the directory number is not registered within any particular remote cluster in the network, typically the user's voicemail service (storage) will be located off their home cluster.

Figure 3:
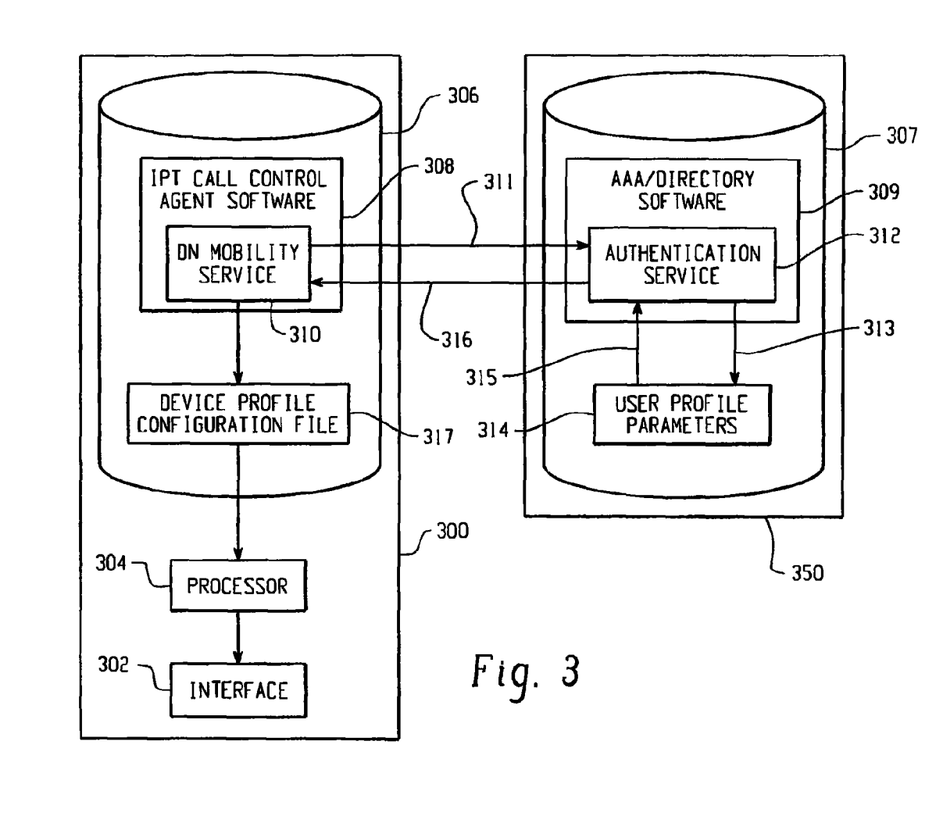
FIG. 3 is a block diagram illustrating an example call manager for directory number mobility in the example system of FIGS. 2A & 2B.

FIG. 3 is a functional block diagram illustrating an example call control agent 300 and an authentication and directory server 350 for call control agents 12, 22, 32 and servers 16, 26, 36 in the system of FIGS. 1, 2A, 2B. Call control agent 300 includes a network interface 302 that receives data from and transmits data to a network (e.g., network 20 in FIG. 2). Network interface 302 is any electrical, physical, electromagnetic, or wireless connection enabling call control agent 300 to be coupled to a network, such as any of the networks 10, 20, 30 in FIGS. 1, 2A, 2B.

Call control agent 300 also includes a user interface 302, a processor 304, and a memory 306 that is accessible by processor 304. Memory 306 contains a device profile configuration file 317 storing users' device profiles, as well as configuration files for telephones within the cluster. Memory 306 also contains telephony control software or firmware 308 that provides various telephony functions needed to control IPT devices. One such function is directory number mobility service 310. Directory number mobility service parameters may be configured to accommodate file transfer between clusters using any suitable synchronization framework with call control and network switch and routing capabilities such as, for example, Cisco's Service Application Framework (SAF) although other file or parameter transfer products or platforms may be used as well.

The authentication and directory server 350 includes a memory 307 that contains user profile configuration parameters 314 storing a users' profiles, such as for example, a user's telephone contact list, dial preferences, and the like. Memory 307 also contains authentication, authorization, accounting (AAA) and directory software or firmware 309 that provides various authentication, authorization, and accounting and directory functions useful to enable users to log into the system by authenticating onto the system using authentication, authorization, and accounting techniques including user's personal credentials such as, for example, PINs, passwords, biometrics, etc. One such authentication function is directory number mobility authentication service 312. The directory number mobility authentication service 312 is in operative communication with the directory number mobility service 310 receiving user and authentication information illustrated at arrow 311 and delivering 316 authentication, authorization, and accounting information therewith illustrated at arrow 316. The directory number mobility authentication service 312 is also in operative communication with the user profile parameter storage 314 delivering parameters illustrated at arrow 313 for storage in the memory 314 and retrieving selected parameters illustrated at arrow 315 from the memory 314. Although the call control agent 300 and the authentication and directory server 350 are shown in FIG. 3 as separate entities, it is to be appreciated that they may be combined and, further, may be combined in one or more of the call control agents 12, 22, 32 of the system.

Referring to FIGS. 2A, 2B and 3, a user 60 may invoke cross cluster directory number mobility service for associating the user's directory number 62 with another IP telephone within the network 200 such as, for example, the IP telephone 24a at the remote cluster B. User 60 may request service by pressing a button on IP telephony device 14a in his home cluster A, if he is in the home cluster; or if he is in the remote cluster, he may press a button on IP telephony device 24a in the remote cluster. IP telephony devices 14a and 24a are both configured to support directory number mobility services. This action in turn invokes a Uniform Resource Locator (URL) for directory number mobility service 310 portion of control software 308 residing in application software 306 within the local call control agent 12. Directory number mobility service 310 is an IP Telephone Service which, among other things, performs the extension mobility login and logout for a user in his home cluster as well as in any of the remote clusters. The login and logout process will be described later in association with FIGS. 4 and 5. Directory number mobility service 310 may be implemented in software, firmware, logic or any suitable combination thereof and, preferably includes a cross cluster extension mobility component and a distributed dial-peer directory number synchronization component. One example implementation of the cross cluster extension mobility component is based on Cisco Unified Advertisement Development Environment Platform. Further, one example implementation of the distributed dial-peer directory number synchronization component is based on Cisco Service Application Framework (SAF) as noted above. However, it is to be appreciated that any cross cluster extension mobility component and any method to dynamically distribute and synchronize directory number dial plans between call control agents may be used as desired.

Based on this URL, the user's request is sent to directory number mobility service 310 via the local area network. In response to the request, directory number mobility service 310 prompts user 60 for personal identification credentials. An authentication service 312 portion of the authentication directory software 309 resides in application software 307 within the local authorization directory server 16. The authentication service 312 is queried as illustrated by arrow 311 and a response illustrated by arrow 316 is provided from the authentication directory server 16 to the call control agent 12. The authentication service 312 accesses user profile parameters 314 as shown by arrow 313 and retrieves selected parameters in the authentication process as shown by arrow 315. If the user is valid, directory number mobility service 310 first determines if user 60 logs in from a telephone device in a remote cluster or from his home cluster.

If user 60 logs in from his home cluster using home IP telephone device 14a, such as in FIG. 2A, then directory number mobility service 310 performs local extension mobility login on the device. If the login is successful, device 14a restarts with the user's device profile (e.g., his speed-dial numbers, telephone template, subscribed service, and others) and including the user's directory number.

On the other hand, if user 60 logs in from the remote cluster using device 24a, such as in FIG. 2B, directory number mobility service 310 first obtains the remote logged-in device information, such as the IP/MAC address and telephone type of the device 24a. For example, the MAC address for device 24a may be 0x123456789abc. Thereafter, the directory number mobility service 310 located at the call control agent 22 associates the user's directory number 62 with the IP Address (IPv4 or IPv6) of the IP device 24a (the IP Telephony end point IP/MAC address information will be mapped during initial end point device registration to the call control agent) such as by a mapping or preferably by inserting dynamic information, and communicates the information and routing of the directory number and registered call control agent IP address by suitable file or parameter transfer means such as, for example, by SAF mechanisms to the other call control agents and gateways 12, 32, etc. within the system 200.

After user authentication such as described above, distributed dial-peer directory number synchronization within the directory number mobility service 310 dynamically injects individual directory number availability information throughout the network between call control agents 12, 22, 32 to enable efficient call routing, distribution, and management of dial plans and to eliminate any single points of failure for IPT call control.

Preferably, the information that is dynamically injected and/or synchronized between all IP telephony call control agents 12, 22, 32 within a domain is the user's directory number and the IP address of the IP telephony call control agent that the user and directory number is currently registered with. This synchronization may be accomplished via a special protocol, by dynamic database updates, or advertised directly via the network. In one preferred form, the dynamic synchronization has a pair of portions including an initial registration advertisement of the association of the directory number with the IP address of the IP telephony call control agent as a first portion, and a removal advertisement as a second portion. The removal advertisement includes information instructing all of the IP telephony call control agents in the domain to delete previous entry/entries regarding the directory number/call control agent IP address association from their respective databases.

Some benefits of directory number mobility feature implemented in systems 200 include a user may log into his cluster seamlessly from anywhere within an enterprise coverage. The user experience is as if he is at his physical telephone in his home cluster. The user has his local number, speed dials, IP services available. There is no need for the user to learn the local dial plan. Also, there is a de-coupling of the user's directory number from specific clusters and a registering of the user's directory number with an IP telephone selected by the user such as a telephone where the mobile user may be located improving overall call routing efficiency and reducing the risk of single point routing failures.

Figure 4:
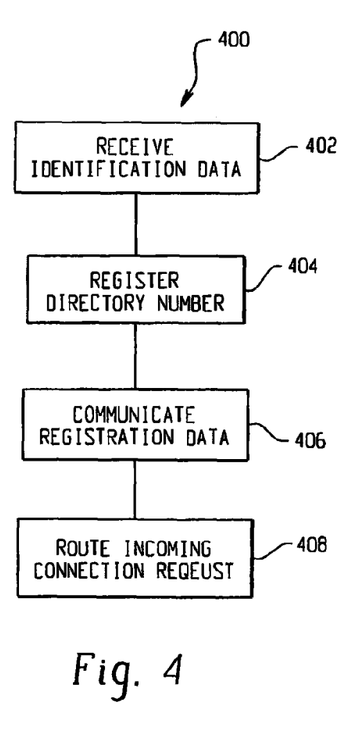
FIG. 4 is a flow chart illustrating an example directory number mobility method in the example system of FIGS. 2A & 2B.

FIG. 4 is a flow chart illustrating an example directory number mobility process 400 performed by the cross cluster extension mobility service system in the example embodiment of FIGS. 2A and 2B. In general, identification data corresponding to an identity of an associated user is received 402 into a first cluster of a multiple cluster telecommunication network. A directory number and associated first telecommunication device corresponding to the user are registered 404 with a first call control agent of the first cluster in accordance with received identification data. Registration data corresponding to the registered directory number is communicated 406 to at least a second cluster of the telecommunications network. Thereafter, an incoming connection request associated with the registered directory number may be directly routed 408 to the first telecommunication device in accordance with the registration data.

Figure 5:
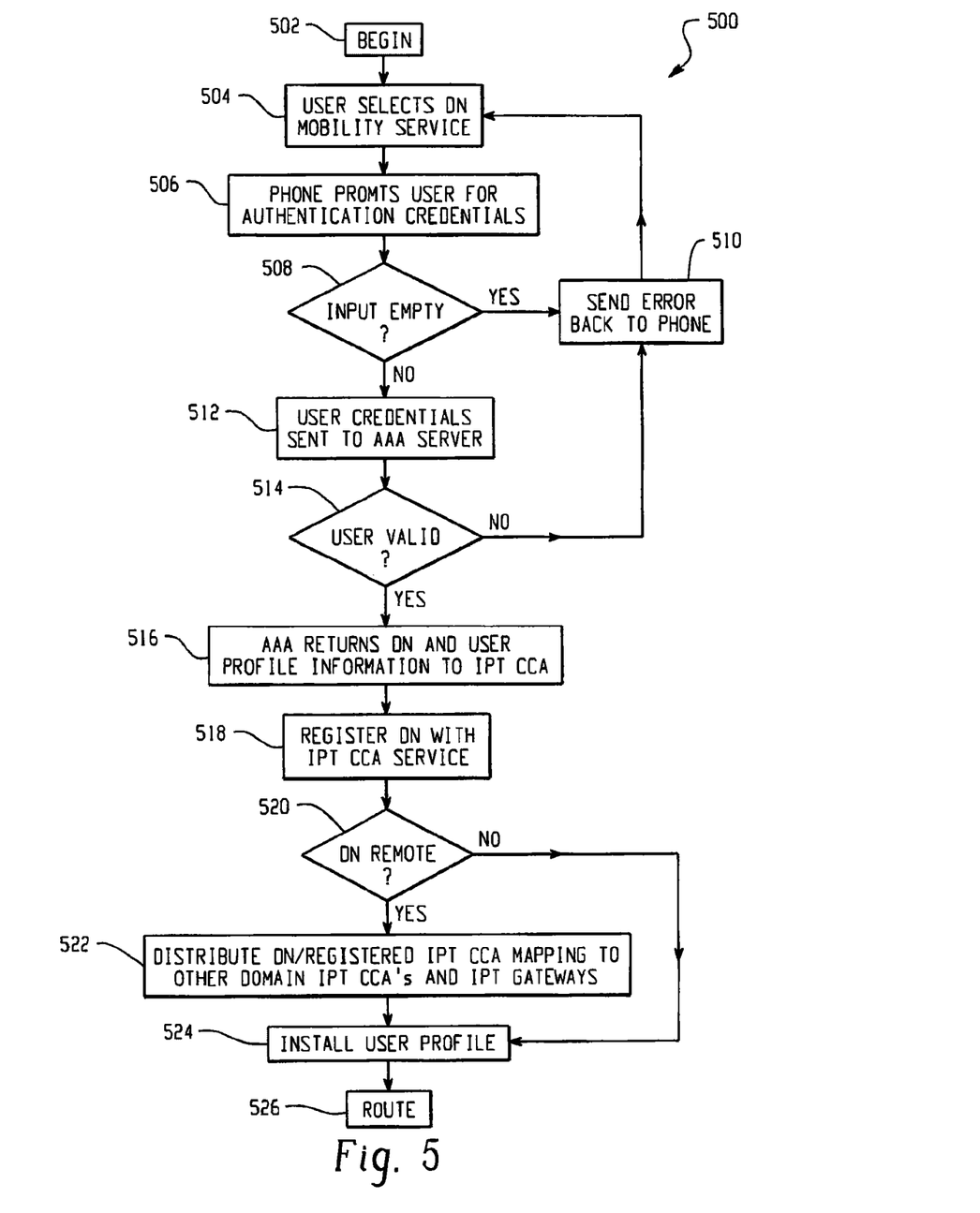
FIG. 5 is a flow chart illustrating a more detailed example directory number mobility method in the example system of FIGS. 2A & 2B.

With reference next to FIG. 5, an example directory number mobility process is shown in greater detail and described below. The directory number mobility process 500 is initiated at step 502. At step 504, a user selects directory number mobility service 310 (e.g., by pressing a button on an IP telephony device). At step 506, directory number mobility service 310 prompts user for personal identification credentials such as, for example, user ID and PIN. If no input is received at step 508 an error message is sent to the logged-in telephone at step 510 and control returns to step 504 wherein the system awaits a further directory number mobility service request 504 from the user. If input is received from the user they are forwarded in step 512 to the authentication service 312 (FIG. 3) by sending 311 the user's credentials from the call control agent. The authentication service 312 returns a reply 316 and, based on the reply a decision at step 514 permits further directory number mobility processing or initiates an error message at step 510. The directory service 309 of the authentication and directory server 26 returns 316 the user's directory number and user profile information at step 516 to the IP telephony call control agent 22 which in turn registers the returned directory number with the IP telephony directory number mobility service 310 of the call control agent software 308 at step 518. The registering includes generating an association of the user's directory number with an IP/MAC address of the IP device the user is attempting to log onto. Preferably, the association includes generating a mapping of the user's directory number and the IP/MAC address of the IP device.

If the user ID is valid, directory number mobility service 310 will determine at step 520 if the user logs in from a remote cluster or from his home cluster. As mentioned earlier, home cluster may be determined using information obtained from the authentication server or comparing the user DN area code prefix to its database of locally responsible prefixes, or any other suitable means well-known in the field but preferably, in the example embodiment, the home cluster is the cluster at which the user is presently registered or associated. If the user logs in from his home cluster, then directory number mobility service 310 performs a local extension directory number mobility login at step 524.

Otherwise if the user logs in from an IP device in the remote cluster, directory number mobility service 310 communicates at step 522 the association of the user's directory number with the IP address of the remote call control agent to each of the other clusters using a distributed dial-peer directory number synchronization framework such as, for example, Cisco's SAF, although other synchronization frameworks with call control and network switch/routing capabilities may be used as well. Directory number mobility service may thereafter perform local extension mobility login at step 524 for the user in the remote cluster.

If the login is successful, the logged-in telephone will restart with the user's device profile parameters, such as his local number, IP service, and speed dials. Thereafter, any calls into the network will be directly routed 526 to the current call control agent that the user is registered with based on the mapping information communicated or otherwise dynamically distributed to all of the call control agents of the various clusters within the network. Each call is examined by the receiving call control agent for a directory number contained in the call information and then routed by the receiving call control agent directly to the appropriate call control agent for further processing and routing to the user's IP device.

It is to be appreciated that the user may roam anywhere within the network from cluster to cluster and re-register his directory number with other call control agents in turn at each mobile stop. The user and system simple re-execute the process described above wherein the user may log into new home telephones as desired. Thus, the user's directory number is mobile and travels with the user analogous to the user's social security number.

Figure 6:
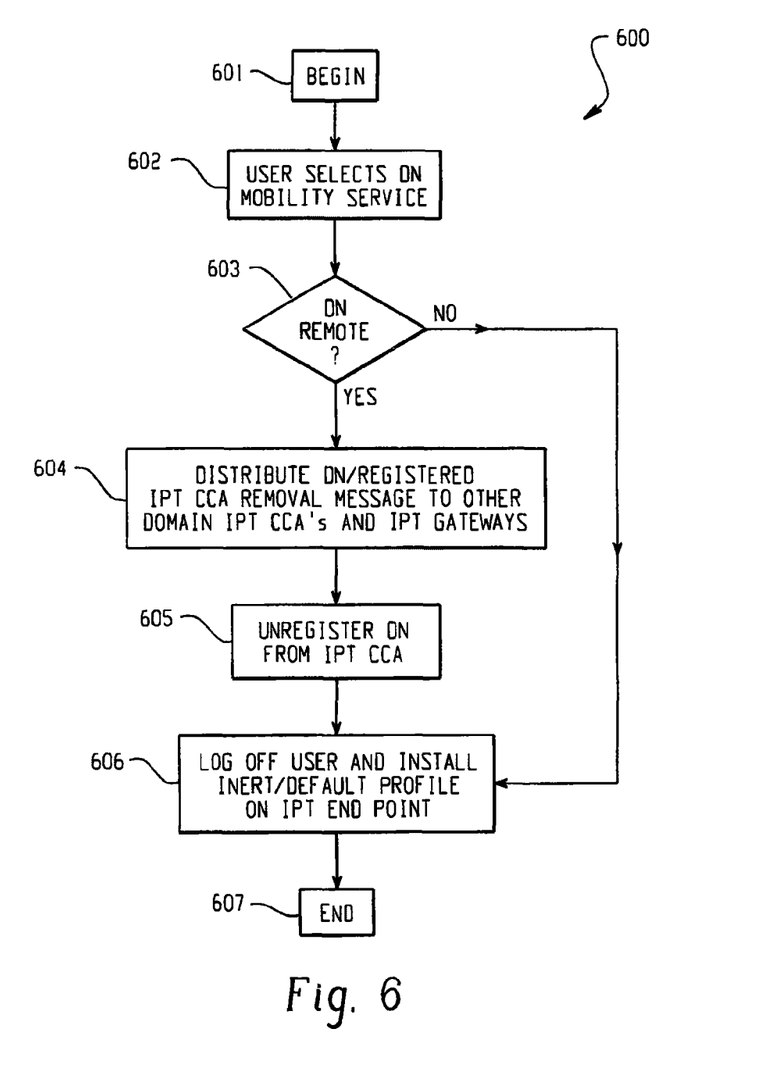
FIG. 6 is a flow chart illustrating an example logout process for directory number mobility in the example system of FIGS. 2A & 2B.

FIG. 6 is a flow chart illustrating an example logout process 600 performed by directory number mobility service 310 in the example system of FIG. 2.

Process 600 begins at step 601. At step 602, the user selects directory number mobility service and opts for logout. If the user is in his home cluster as determined at step 603, directory number mobility service 310 performs local extension directory number mobility logout at step 606. Preferably, the directory number mobility logout includes installing an inert/default profile in the IP telephony end point where the user is logging off. This enables other users to log in to use the telephone but with a set of generic or default user parameters such as a basic set of names in a telephone directory listing.

Otherwise if the user is in the remote cluster (Asia in the example), then at step 604, directory number mobility service 310 communicates a directory number/IP address removal message to all of the other call control agents in the network preferably using a distributed dial-peer directory number synchronization framework such as, for example, Cisco's SAF, although other synchronization frameworks with call control and network switch/routing capabilities may be used as well. At step 605, directory number mobility service 310 performs extension directory number mobility logout for the user in the remote cluster.

After the user logs out from the IP telephone, a set of default or "inert" parameters are installed on the telephone so that it may be restarted by another user later with the default configuration file stored in its home of origin call control agent's database.

Alternatively to the log out steps described above, directory number mobility service 310 may log out users automatically after a certain period of inactivity, and this value may be set by a system policy or on a per user basis. The time value is configurable, as well as the ability for automatic logout.

Figure 7:
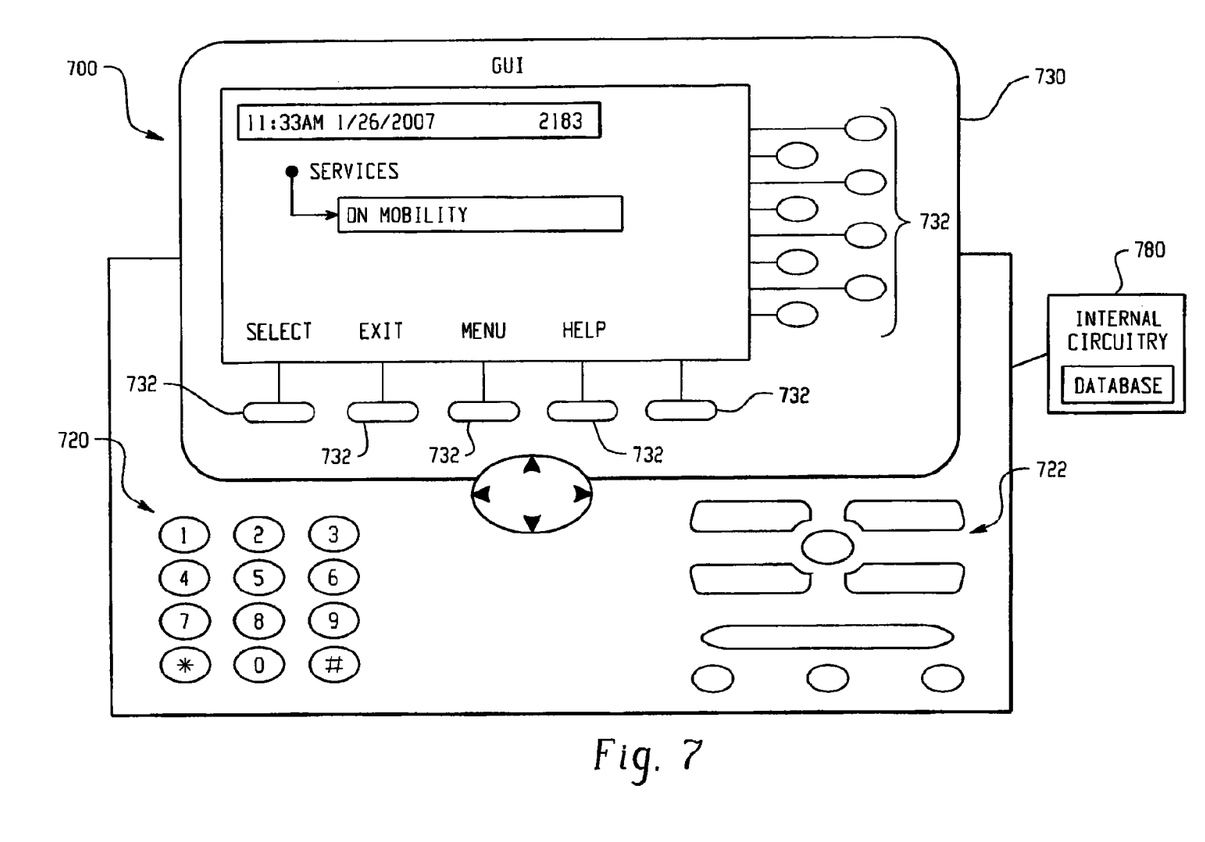
FIG. 7 is an example communication device for supporting directory number mobility in the example system of FIGS. 2A & 2B.

FIG. 7 depicts a communication device 700 in an example implementation for an IP telephony device to support directory number mobility, such as Cisco's 7961 telephone. It should be appreciated that communication device 700 may be of a variety of implementations that is directory number mobility enabled, e.g., a digital cellular telephone, an IP telephone, a portable computer such as a laptop, a personal digital assistant, other device, apparatus, appliances, and the like.

Functionality of device 700 is provided with circuitry 780, which is internal to device 700 and isolated from the environment in which the device is deployed from contamination or user contact. Components of circuitry of 780 and their effective interrelations are well known in the communicating, computing and related arts.

A user may, in various implementations, interface with circuitry 780 using one or more of several modalities. For example, familiar telephonic operation may be conducted using hard keys 720. Other operations, such as transferring a caller, placing a caller on hold, or selecting directory number mobility service, may be performed with keys 722 or through software based interface. For the purposes of this application, the term "button" means any type of switch, selection on a computer, or other user input used to indicate the selection of a particular feature of a communication device. Software based interface modalities for user interface with circuitry 780 comprises, a graphical user interface (GUI) 730 and the accompanying soft keys 732.

In an example implementation, the user may use hard keys 720 on device 700 to provide an input to circuitry 780 to invoke directory number mobility service. In another implementation, programmable soft keys 732 provided with GUI 730, allows the user to select directory number mobility service. In yet another implementation, the user may invoke directory number mobility service using a web interface.

Finally, those of skill in the art will appreciate that the method and system described and illustrated herein may be implemented in software, firmware or hardware, or any suitable combination thereof. Preferably, the method and system are implemented in software, for purposes of low cost and flexibility. Those of skill in the art will appreciate that the method and system may be implemented in logics encoded in one or more tangible media for execution in a machine. Alternative embodiments are contemplated and are within the spirit and scope of the following claims.

Figure 8:
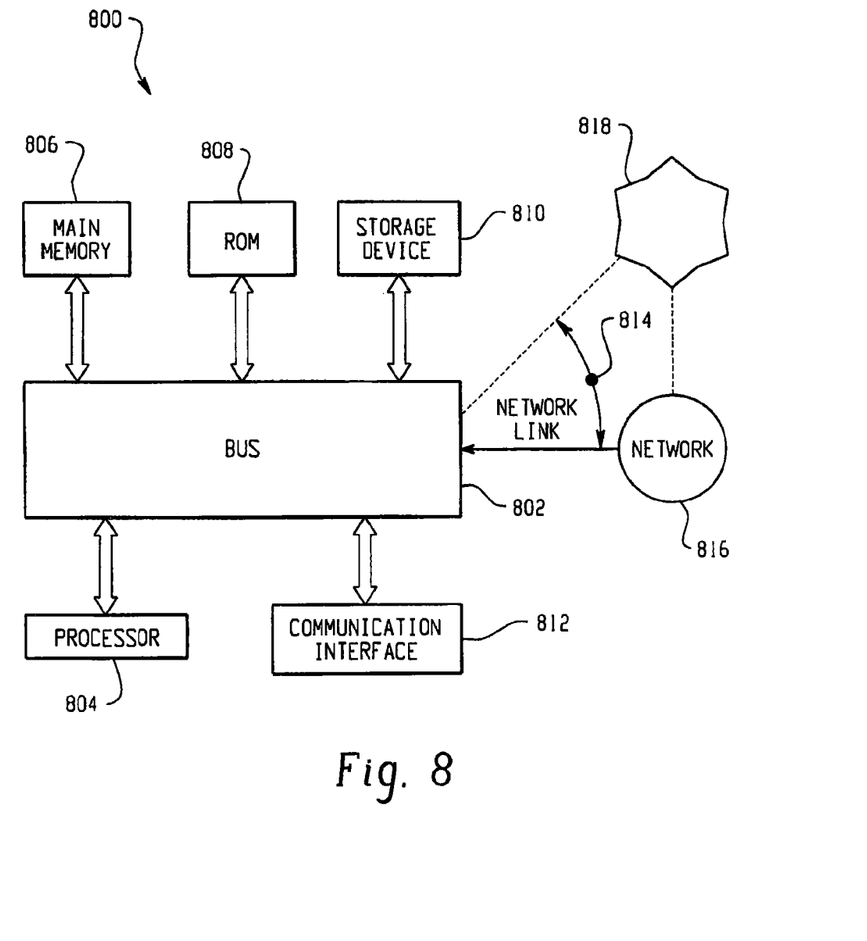
FIG. 8 is a block diagram of an example embodiment computer system for implementing directory number mobility.

FIG. 8 is a block diagram of a computer system 800 for implementing an example embodiment. For example, computer system 800 is suitably adapted for implementing the directory number mobility system 100 (FIG. 1). Computer system 800 includes a bus 802 or other communication mechanism for communicating information and a processor 804 coupled with bus 802 for processing information. Computer system 800 also includes a main memory 806, such as random access memory (RAM) or other dynamic storage device coupled to bus 802 for storing information and instructions to be executed by processor 804. Main memory 806 also may be used for storing a temporary variable or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

An embodiment is related to the use of computer system 800 for directory number mobility using dynamic network distributed dial-peer updates. According to one embodiment, directory number mobility and dynamic network distributed dial-peer updates are provided by computer system 800 in response to processor 804 executing one or more sequences of one or more instructions contained in main memory 806. Such instructions may be read into main memory 806 from another computer-readable medium, such as storage device 810. Execution of the sequence of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the embodiment. Thus, embodiments are not limited to any specific combination of hardware circuitry and software.

"Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In addition, the terms "computer-readable medium" and "tangible medium" for execution as used herein refers to any medium that participates in providing instructions to processor 804 for execution. Such a medium may take many forms, including but not limited to non-volatile media, volatile media, and transmission media. Non-volatile media include for example optical or magnetic disks, such as storage device 810. Volatile media include dynamic memory such as main memory 806. Transmission media include coaxial cables, copper wire and fiber optics, including the wires that comprise bus 802. Transmission media may also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer may read. It is to be appreciated that the apparatus shown is illustrated with separate functional blocks only for purposes of describing example embodiments and that the apparatus is not limited to the particular functional blocks shown and, further, one or more of the functions may be performed by one or more of the blocks illustrated.

Various forms of computer-readable media may be involved in carrying one or more sequences of one or more instructions to processor 804 for execution. For example, the instructions may initially be borne on a magnetic disk of a remote computer. The remote computer may load the instructions into its dynamic memory and send the instructions over a telephone line using a modem. A modem local to computer system 800 may receive the data on the telephone line and use an infrared transmitter to convert the data to an infrared signal. An infrared detector coupled to bus 802 may receive the data carried in the infrared signal and place the data on bus 802. Bus 802 carries the data to main memory 806 from which processor 804 retrieves and executes the instructions. The instructions received by main memory 806 may optionally be stored on storage device 810 either before or after execution by processor 804.

Computer system 800 also includes a communication interface 812 coupled to bus 802. Communication interface 812 provides a two-way data communication coupling to a network link 814 that is connected to a network 816. For example, communication interface 812 may be a local area network (LAN) card to provide a data communication connection to a compatible LAN. Wireless links may also be implemented. In any such implementation, communication interface 812 sends and receives electrical, electromagnetic, or optical signals that carry digital data streams representing various types of information.

Network link 814 typically provides data communication through one or more networks to other data devices, such as IP telephones, APs, computers, and other client devices. For example, network link 814 may provide a connection through network 816 to the Internet 818. Network 816 and the Internet 818 may use electrical, electromagnetic, or optical signals that carry the digital data to and from computer system 800, which are exemplary forms of carrier waves transporting the information.

Computer system 800 may send messages and receive data, including program codes, through the network(s), network link 814, and communication interface 812. In the Internet example, a server (not shown) might transmit a requested code for an application program through the Internet to network 816, and communication interface 812. In accordance with the embodiment, one such downloaded application provides directory number mobility as described herein.

The received code may be executed by processor 804 as it is received, and/or stored in storage device 810, or other non-volatile storage for later execution. In this manner, computer system 800 may obtain application code in the form of a carrier wave.

What has been described above includes example implementations. It is, of course, not possible to describe every conceivable combination of components or methodologies for purposes of describing the various embodiments, but one of ordinary skill in the art will recognize that many further combinations and permutations are possible. Accordingly, the scope of the appended claims interpreted in accordance with the breadth to which they are fairly, legally, and equitably entitled include all such equivalents, alterations, modifications, and variations.

What is claimed is:

1. A method, comprising:
   receiving data representative of a user logging in at a telecommunication device at a first cluster of a multiple cluster telecommunication network;
   determining a directory number for the user;
   associating the directory number for the user with the telecommunication device;
   registering the directory number for the user and the telecommunication device with a first call control agent associated with the first telecommunication cluster, the first call control agent having an Internet Protocol (IP) address;
   determining whether the user logged in from a home cluster or a remote cluster; and
   communicating data associating the directory number for the user with the IP address of the first call control agent to at least a second call control agent associated with a second cluster of the multiple cluster telecommunication network responsive to determining that the user logged in from a remote cluster.

2. The method according to claim 1 further comprising authenticating the associated user.

3. The method according to claim 1 wherein:
   the associated telecommunication device is an Internet Protocol (IP) device having an IP address;
   the registering further comprises generating mapping information associating the directory number with the IP address; and
   the communicating further comprises communicating the mapping information to the at least a second call control agent associated with a second cluster of the multiple cluster telecommunication network.

4. The method according to claim 1 further comprising routing an incoming connection request associated with the registered directory number received by the multiple cluster telecommunication network to the telecommunication device via the first call control agent in accordance with the registration data.

5. The method according to claim 1 further comprising:
   deregistering the directory number and the associated telecommunication device corresponding to the user with the at least a second call control agent of the second cluster in response to communicating data associating the directory number for the user with the IP address of the first call control agent to at least a second call control agent associated with a second cluster of the multiple cluster telecommunication network.

6. The method according to claim 1 further comprising:
   deregistering the directory number and the associated telecommunication device corresponding to the user with the first call control agent of the first cluster in accordance with received session termination date, wherein the session termination data corresponds to one of a group consisting of a time expiration signal and logout information received from the user;
   communicating deregistration data corresponding to the deregistered directory number to the at least a second control agent of the second cluster in the multiple cluster telecommunication network; and
   routing an incoming connection request associated with the deregistered directory number to a default telecommunication device of the associated user in accordance with default registration data.

7. The method according to claim 1 further comprising:
   receiving data representative of the user logging in from a subsequent telecommunication device at a cluster of the multiple cluster telecommunication network;
   associating the directory number with the subsequent telecommunication device of the cluster responsive to receiving data representative of the user logging in from the subsequent telecommunication device;
   registering the directory number for the user and the telecommunication device with a call control agent associated with the subsequent telecommunication cluster; and
   communicating data associating the directory number for the user with the IP address of the call control agent associated with the subsequent telecommunication device to at least the first call control agent associated with the first cluster of the multiple cluster telecommunication network responsive to receiving data of the user logging in from a subsequent telecommunication device.

8. An apparatus, comprising:
   an input operable to receive from a telecommunication device associated with a first cluster of a multiple cluster telecommunication network, data representative of an identity of an associated user;
   a registry comprising logic operable to determine a directory number previously registered within the multiple cluster telecommunication network for the associated user and to associate the directory number with the telecommunication device;
   the registry further comprises logic operable to register the directory number for the user and the association with the telecommunication device corresponding to the user with a first call control agent associated with the first telecommunication cluster in accordance with received identification data, the first call control agent having an Internet Protocol (IP) address;
   the registry further comprises logic operable to determine whether the user logged in from a home cluster or a remote cluster; and
   a broadcaster comprising logic operable to communicate data corresponding to the directory number associated with the IP address of the first call control agent to at least a second call control agent associated with a second cluster of the multiple cluster telecommunication network responsive to the registry determining that the user logged in from a remote cluster.

9. The apparatus according to claim 8 further comprising an authenticator including logic operable to authenticate the associated user.

10. The apparatus according to claim 8 wherein:
the associated telecommunication device is an Internet Protocol (IP) device having an IP address;
the registry further comprises logic operable to generate mapping information associating the directory number with the IP address; and
the broadcaster comprises logic operable to communicate the mapping information to the at least a second call control agent associated with a second cluster of the multiple cluster telecommunication network.

11. The apparatus according to claim 8 further comprising a router operable route an incoming connection request associated with the registered directory number received by the multiple cluster telecommunication network to the telecommunication device via the first call control agent in accordance with the registration data.

12. The apparatus according to claim 8 further wherein:
the registry comprises logic operable to deregister the directory number and the associated telecommunication device corresponding to the user with the at least a second call control agent of the second cluster in response to communicating data associating the directory number for the user with the IP address of the first call control agent to at least a second call control agent associated with a second cluster of the multiple, cluster telecommunication network.

13. The apparatus according to claim 8 wherein:
the registry comprises logic operable to deregister the directory number and the associated telecommunication device corresponding to the user with the first call control agent of the first cluster in accordance with received session termination date, wherein the session termination data corresponds to one of a group consisting of a time expiration signal and logout information received from the user;
the broadcaster comprises logic operable to communicate deregistration data corresponding to the deregistered directory number to the at least a second control agent of the second cluster in the multiple cluster telecommunication network; and
the router is operable to route an incoming connection request associated with the deregistered directory number to a default telecommunication device of the associated user in accordance with default registration data.

14. The apparatus according to claim 8 further comprising:
a second input operable to receive, from a subsequent telecommunicate device at a cluster of the multiple cluster telecommunication network, identification data corresponding to the identity of the associated user;
a second registry comprising logic operable to associate the directory number for the associated user with the subsequent telecommunication device;
wherein the second registry further comprises logic operable to register the directory number for the user and the telecommunication device with a call control agent associated with the subsequent telecommunication cluster; and
a second broadcaster including logic operable to communicate data associating the directory number for the user with the IP address of the call control agent associated with the subsequent telecommunication device to at least the first call control agent associated with the first duster of the multiple cluster telecommunication network responsive to receiving data of the user logging in from a subsequent telecommunication device.

15. Logic encoded in one or more tangible, non-transitory computer readable media for execution by a processor and when executed operable to:
receive data representative of a user logging in at a telecommunication device at a first cluster of a multiple cluster telecommunication network;
determine a directory number for the user;
associate the directory number for the user with the telecommunication device;
register the directory number for the user and the telecommunication device with a first call control agent associated with the first telecommunication cluster, the first call control agent having an Internet Protocol (IP) address;
determine whether the user logged in from a home duster or a remote cluster; and
communicate data associating the directory number for the user with the IP address of the first call control agent to at least a second call control agent associated with a second cluster of the multiple cluster telecommunication network responsive to determining that the user logged in from a remote cluster.

16. The logic according to claim 15 further operable to authenticate the associated user.

17. The logic according to claim 15 wherein:
the associated telecommunication device is an Internet Protocol (IP) device having an IP address;
wherein the logic is further operable to generate mapping information associating the directory number with the IP address; and
the logic is further operable to communicate the mapping information to the at least a second call control agent associated with a second cluster of the multiple cluster telecommunication network.

18. The logic according to claim 15 wherein the logic is further operable to route an incoming connection request associated with the registered directory number received by the multiple cluster telecommunication network to the telecommunication device via the first call control agent in accordance with the registration data.

19. The logic according to claim 15 wherein the logic is further operable to deregister the directory number and the associated telecommunication device corresponding to the user with the at least a second call control agent of the second cluster in response to communicating data associating the directory number for the user with the IP address of the first call control agent to at least a second call control agent associated with a second cluster of the multiple cluster telecommunication network.

20. The logic according to claim 15 wherein the logic is further operable to:
deregister the directory number and the associated telecommunication device corresponding to the user with the first call control agent of the first cluster in accordance with received session termination date, wherein the session termination data corresponds to one of a group consisting of a time expiration signal and logout information received from the user;
communicate deregistration data corresponding to the deregistered directory number to the at least a second control agent of the second cluster in the multiple cluster telecommunication network; and route an incoming connection request associated with the deregistered directory number to a default telecommunication device of the associated user in accordance with default registration data.

* * * * *